US011189303B2

(12) United States Patent
Kovvali et al.

(10) Patent No.: US 11,189,303 B2
(45) Date of Patent: Nov. 30, 2021

(54) PERSISTENT INTERFERENCE DETECTION

(71) Applicant: Cirrus Logic International Semiconductor Ltd., Edinburgh (GB)

(72) Inventors: Narayan Kovvali, Tempe, AZ (US); Seth Suppappola, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/714,190

(22) Filed: Sep. 25, 2017

(65) Prior Publication Data
US 2019/0096429 A1    Mar. 28, 2019

(51) Int. Cl.
*G10L 25/84* (2013.01)
*G01S 3/808* (2006.01)
(Continued)

(52) U.S. Cl.
CPC ............ *G10L 25/84* (2013.01); *G01S 3/8006* (2013.01); *G01S 3/8083* (2013.01);
(Continued)

(58) Field of Classification Search
CPC ......... G10L 25/78; G10L 25/81; G10L 25/84; G10L 25/87; G10L 25/93;
(Continued)

(56) References Cited

U.S. PATENT DOCUMENTS 5,579,435 A * 11/1996 Jansson .................... H04L 27/00
704/233
9,008,329 B1 * 4/2015 Mandel .................. G10K 15/00
381/71.1
(Continued)

FOREIGN PATENT DOCUMENTS

JP         2003337164 A  * 11/2003  .............. H04R 3/00

OTHER PUBLICATIONS

Quora ("What is the difference between stationary and non-stationary environmental noise", GoogleTM search result from Quora Q/A, Tim's answer and John's answer, Nov. 3, p. 1 (Year: 2016).*

*Primary Examiner* — Leshui Zhang
(74) *Attorney, Agent, or Firm* — Norton Rose Fulbright US LLP

(57) ABSTRACT

A multi-microphone algorithm for detecting and differentiating interference sources from desired talker speech in advanced audio processing for smart home applications is described. The approach is based on characterizing a persistent interference source when sounds repeated occur from a fixed spatial location relative to the device, which is also fixed. Some examples of such interference sources include TV, music system, air-conditioner, washing machine, and dishwasher. Real human talkers, in contrast, are not expected to remain stationary and speak continuously from the same position for a long time. The persistency of an acoustic source is established based on identifying historically-recurring inter-microphone frequency-dependent phase profiles in multiple time periods of the audio data. The detection algorithm can be used with a beamforming processor to suppress the interference and for achieving voice quality and automatic speech recognition rate improvements in smart home applications.

16 Claims, 9 Drawing Sheets

(51) Int. Cl.
*G01S 3/80* (2006.01)
*H04R 1/40* (2006.01)
*H04R 3/00* (2006.01)
*G10L 21/0208* (2013.01)
*G10L 21/0216* (2013.01)
*G10L 21/0224* (2013.01)
*G10L 21/0232* (2013.01)

(52) U.S. Cl.
CPC .......... *G10L 21/0208* (2013.01); *H04R 1/406* (2013.01); *H04R 3/005* (2013.01); *G10L 2021/02166* (2013.01); *H04R 2201/401* (2013.01); *H04R 2227/005* (2013.01); *H04R 2430/20* (2013.01)

(58) Field of Classification Search
CPC ......... G10L 2025/783; G10L 2025/786; G10L 21/0208; G10L 21/0224; G10L 21/0232; G10L 21/0264; G10L 21/0272; G10L 21/028; G10L 21/0308; G10L 21/0364; G10L 2021/02082; G10L 2021/02085; G10L 2021/02087; G10L 2021/02166; G10L 21/0216; G10L 2227/005; G10L 2430/20; G10L 2201/401; H04R 1/40; H04R 1/406; H04R 3/005; H04R 2201/40; H04R 2201/401; H04R 2201/403; H04R 2201/405; H04R 2430/20; H04R 3/00; G01S 3/8006

USPC ........ 381/56, 57, 58, 60, 66, 313, 320, 71.1, 381/71.3, 71.4, 71.11, 71.12, 71.13, 381/71.14, 73.1, 72, 74, 91, 92, 74.1, 381/94.7, 95, 97, 98, 99, 100, 103, 111, 381/112, 113, 114, 115, 119, 121, 122; 704/E21.006, E21.012; 700/94
See application file for complete search history.

(56) References Cited

U.S. PATENT DOCUMENTS

| | | | |
|---|---|---|---|
| 9,640,179 B1* | 5/2017 | Hart | ................ G10L 15/20 |
| 2004/0213419 A1* | 10/2004 | Varma et al. | |
| 2008/0040101 A1* | 2/2008 | Hayakawa | ............. H04R 3/005 |
| | | | 704/203 |
| 2009/0226005 A1* | 9/2009 | Acero | ................ G10L 21/0208 |
| | | | 381/92 |
| 2012/0035920 A1* | 2/2012 | Hayakawa | .......... G10L 21/0208 |
| | | | 704/226 |
| 2012/0128176 A1 | 5/2012 | Acero et al. | |
| 2012/0154610 A1 | 6/2012 | Rahbar et al. | |
| 2012/0245933 A1 | 9/2012 | Flaks et al. | |
| 2013/0039503 A1 | 2/2013 | Beaucoup et al. | |
| 2014/0241549 A1* | 8/2014 | Stachurski | ............ H04M 3/568 |
| | | | 381/92 |

* cited by examiner

PERSISTENT INTERFERENCE DETECTION

FIELD OF THE DISCLOSURE

The instant disclosure relates to audio processing. More specifically, portions of this disclosure relate to far-field audio processing.

BACKGROUND

Far-field input in an audio system refers to an audio signal originating a far distance from a microphone. Far-field input may be from a talker in a large room, a musician in a large hall, or a crowd in a stadium. Far-field input is contrasted by near-field input, which is an audio signal originating near the microphone. An example near-field input is a talker speaking into a cellular phone during a telephone call. Processing audio signals in the far field presents challenges because the strength of an audio signal decays in proportion to the distance of the talker from the microphone. The farther a person is from a microphone, the quieter the person's voice is when it reaches the microphone. Processing far-field signals also presents a challenge of reduced intelligibility due to the reverberant quality of the sound. Furthermore, noise sources can be present, interfering with the desired talker's voice. For example, a radio playing in the room while a person is talking makes the talker difficult to hear. When the talker is closer to the microphone than the interference source is, such as in near-field processing, the talker's voice is higher in amplitude than the interference source. When the talker is far from the microphone, such as in far-field processing, the talker's voice can be of the same or lower amplitude than the interference source. Thus, the person's voice is more difficult to discern in the presence of interference in far-field processing.

One application of far-field technology is in smart home devices. A smart home device is an electronic device configured to receive user speech input, process the speech input, and take an action based on the recognized voice command. An example smart home device in a room is shown in FIG. 1. A living room 100 may include a smart home device 104. The smart home device 104 may include a microphone, a speaker, and electronic components for receiving speech input and playing speech or music. Individuals 102A and 102B may be in the room and communicating with each other or speaking to the smart home device 104. Individuals 102A and 102B may be moving around the room, moving their heads, putting their hands over their face, or taking other actions that change how the smart home device 104 receives their voices. Also in the living room 100 may be sources of noise or interference, audio signals that are not intended to activate the smart home device 104 or that interfere with the smart home device 104's reception of speech from individuals 102A and 102B. Some sources of interference include a television 110A and a radio 110B. Other sources of interference not illustrated may include washing machines, dishwashers, sinks, microwave ovens, music systems, etc.

The smart home device 104 may incorrectly process voice commands because of the presence of interference. Speech from the individuals 102A and 102B may not be recognizable by the smart home device 104 because the amplitude of interference drowns out the individual's speech. In some situations, speech from an interference source, such as television 110A, may be incorrectly recognized as a speech command. For example, a commercial on the television 110A may encourage a user to "buy product X" and the smart home device 104 may process the speech and automatically order product X. Additionally, speech from the individuals 102A and 102B may be incorrectly processed. For example, user speech for "buy backpacks" may be incorrectly recognized as "buy batteries" due to interference from the interference sources.

Shortcomings mentioned here are only representative and are included simply to highlight that a need exists for improved electrical components, particularly for audio processing employed in consumer-level devices, such as audio processing for far-field pickup in smart home devices. Embodiments described herein address certain shortcomings but not necessarily each and every one described here or known in the art. Furthermore, embodiments described herein may present other benefits than, and be used in other applications than, those of the shortcomings described above. For example, similar shortcomings may be encountered in other audio devices, such as mobile phones, and embodiments described herein may be used in mobile phones to solve such similar shortcomings as well as other shortcomings.

SUMMARY

Voice quality and automatic speech recognition performance may be improved by using new techniques for processing microphone signals received by an electronic device. Two or more microphones may be used to record sounds from the environment, and the received sounds processed to obtain information regarding the environment. For example, audio signals from two or more microphones may be processed to spatially detect interference sources. The detected interference sources can be excluded from automatic speech recognition processing to prevent accidental triggering of commands. The detection of the interference sources may also be used to filter out the detected interference from the microphone signals to improve the recognition of desired speech.

Many interference sources encountered in home environments can be characterized as persistent interference sources. Persistent interference sources are those that recur from a fixed spatial location relative to the device, which is also fixed. In contrast, real human talkers are not expected to remain stationary and speak continuously from the same position over time. This observation regarding the persistence of interference sources may be used to distinguish persistent interference sources from desired talkers. In some embodiments, a method for detecting persistent interference sources may include receiving audio data from a microphone array with two microphones placed at a fixed location in the environment. Multiple time periods of audio data may be recorded in the first and second microphone signals. An acoustic source may be identified as a persistent interference source when the source is determined to be originating from the same spatial location with respect to the microphone array over several time periods. The persistence may be tracked using the inter-microphone frequency-dependent phase profile for the microphones on the array. When the microphone array includes three or more microphones, the acoustic source identification may be based on the inter-microphone frequency-dependent phase profile from multiple pairs of microphones.

Other information regarding the environment may also be obtained from the multiple-microphone signals. For example, the microphone signals may be processed to infer the locations of talkers. By improving these and other aspects of audio signal processing, far-field audio processing may be used to enhance the performance of smart home devices. Although examples using smart home devices are provided in the described embodiments, the far-field audio processing may enhance operation of other electronic devices, such as cellular phones, tablet computers, personal computers, portable entertainment devices, automobile entertainment devices, home entertainment devices. Further, aspects of embodiments described herein may also be applied to near-field audio processing, and the described embodiments should not be considered to limit the invention to far-field audio processing.

Electronic devices incorporating functions for automatic speech recognition, audio processing, audio playback, smart home automation, and other functions may benefit from the audio processing described herein. The algorithms performing the audio processing may be integrated in hardware components of the electronic devices or programmed as software or firmware to execute on the hardware components of the electronic device. The hardware components may include processors or other components with logic units configured to execute instructions. The programming of instructions to be executed by the processor can be accomplished in various manners known to those of ordinary skill in the art. Additionally or alternatively to integrated circuits comprising logic units, the integrated circuits may be configured to perform the described audio processing through discrete components, such as transistors, resistors, capacitors, and inductors. Such discrete components may be configured in various arrangements to perform the functions described herein. The arrangement of discrete components to perform these functions can be accomplished by those of ordinary skill in the art. Furthermore, discrete components can be combined with programmable components to perform the audio processing. For example, an analog-to-digital converter (ADC) may be coupled to a digital signal processor (DSP), in which the ADC performs some audio processing and the DSP performs some audio processing. The ADC may be used to convert an analog signal, such as a microphone signal, to a digital representation of sounds in a room. The DSP may receive the digital signal output from the ADC and perform mathematical operations on the digital representation to identify and/or extract certain sounds in the room. Such a circuit including analog domain components and digital domain components may be referred to as a mixed signal circuit, wherein "mixed" refers to the mixing of analog and digital processing.

In some embodiments, the mixed signal circuit may be integrated as a single integrated circuit (IC). The IC may be referred to as an audio controller or audio processing because the IC is configured to process audio signals as described herein and is configured to provide additional functionality relating to audio processing. However, an audio controller or audio processor is not necessarily a mixed signal circuit, and may include only analog domain components or only digital domain components. For example, a digital microphone may be used such that the input to the audio controller is a digital representation of sounds and analog domain components are not included in the audio controller. In this configuration, and others, the integrated circuit may have only digital domain components. One example of such a configuration is an audio controller having a digital signal processor (DSP). Regardless of the configuration for processing audio, the integrated circuit may include other components to provide supporting functionality. For example, the audio controller may include filters, amplifiers, equalizers, analog-to-digital converters (ADCs), digital-to-analog converters (DACs), a central processing unit, a graphics processing unit, a radio module for wireless communications, and/or a beamformer. The audio may be used in electronic devices with audio outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
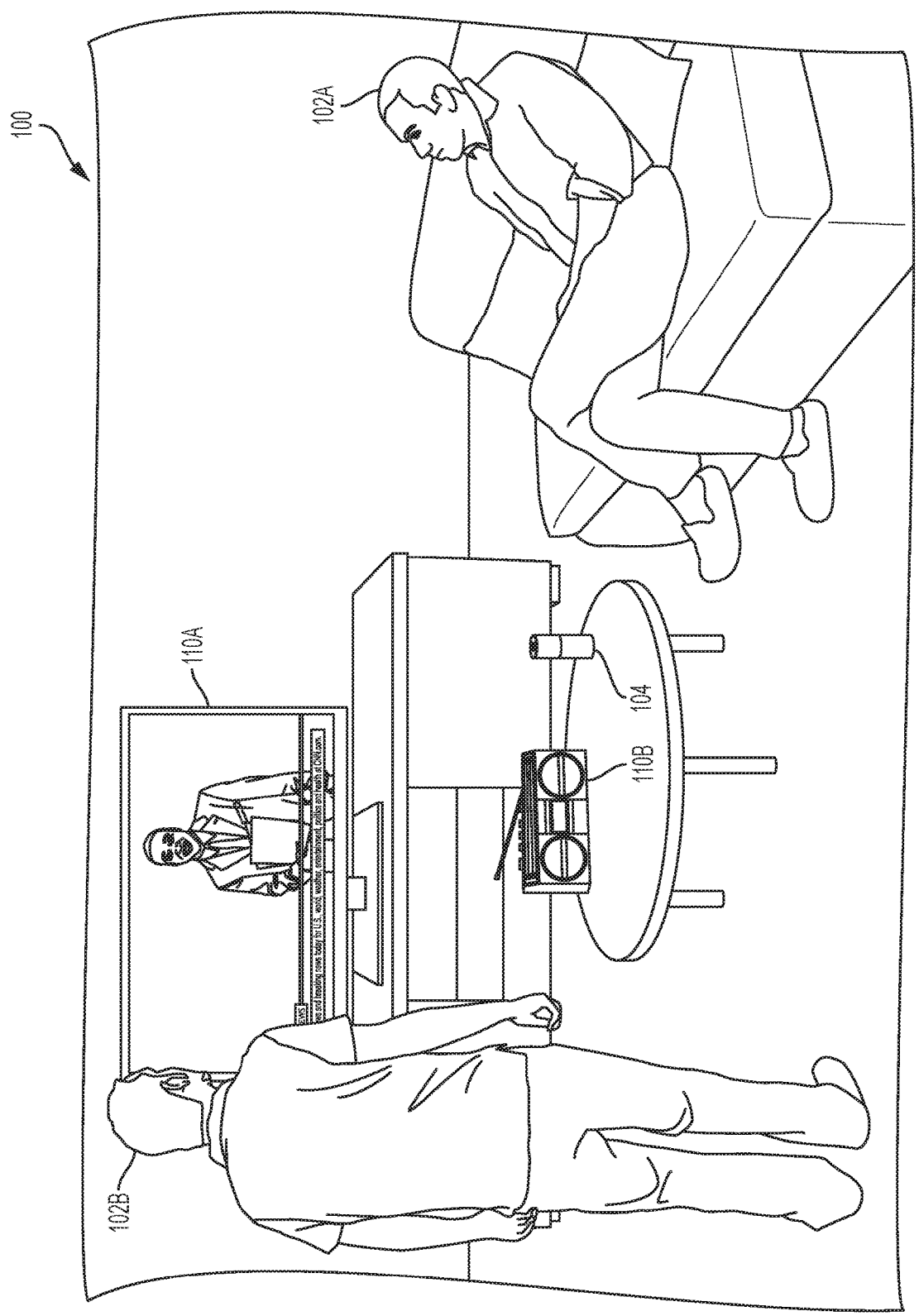
FIG. 1 is an illustration of a conventional smart home device in a room.
Figure 2:
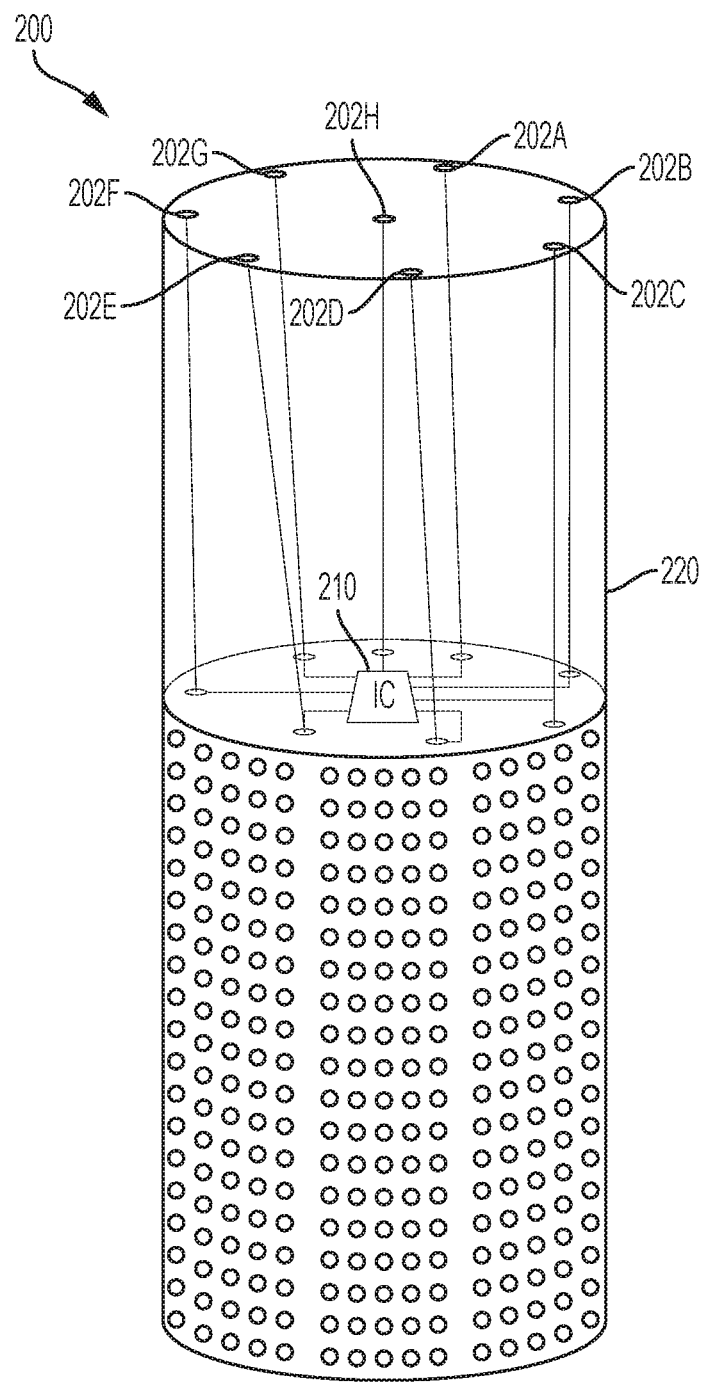
FIG. 2 is a perspective view of a smart home device, such as a smart assistant, with components used for audio processing according to some embodiments of the disclosure.

Far-field audio processing may use microphone signals from two or more microphones of an electronic device. An electronic device, such as a smart home device 200 shown in FIG. 2, may include a microphone array 202 including microphones 202A-G. The microphones 202A-G may be any microphone device that transduces pressure changes (such as created by sounds) into an electronic signal. One example device is a miniature microphone, such as a micro-electro-mechanical system (MEMS) microphone. Another example is a digital microphone (DMIC). The microphones 202A-G may be arranged in various configurations on the smart home device 200. The different positions result in each of the microphones 202A-G receiving different audio signals at any moment in time. Despite the difference, the audio signals are related as corresponding to the same environment and the same sound sources in the environment. The similarity and the difference of the audio signals may be used to infer characteristics of the environment and/or the sound sources in the environment.

An integrated circuit (IC) 210 may be coupled to the microphones 202A-G and used to process the signals produced by the microphones 202A-G. The IC 210 performs functions of the far-field audio processing of the invention, such as described in the embodiment of FIG. 8. The output of the IC 210 may vary in different embodiments based on a desired application. In smart home device 200, the IC 210 may output a digital representation of audio received through the microphones 202A-G and processed according to embodiments of the invention. For example, processing of the microphone signals may result in a single output audio signal with enhanced signal-to-noise ratio that allows for more accurate and reliable automatic recognition of speech from a desired talker. The output audio signal may be encoded in a file format, such as MPEG-1 Layer 3 (MP3) or Advanced Audio Codec (AAC) and communicated over a network to a remote device in the cloud. The remote device may perform automatic speech recognition on the audio file to recognize a command in the speech and perform an action based on the command. The IC 210 may receive an instruction from the remote device to perform an action, such as to play an acknowledgement of the command through a loudspeaker 220. As another example, the IC 210 may receive an instruction to play music, either from a remote stream or a local file, through the loudspeaker 220. The instruction may include an identifier of a station or song obtained through automatic speech recognition performed on the audio signal from the far-field audio processing of the invention.

The microphones 202A-H are illustrated as integrated in a single electronic device in example embodiments of the invention. However, the microphones may be distributed among several electronic devices. For example, in some embodiments, the microphones 202A-H may be in multiple devices at different locations in a living room. Those devices may wirelessly communicate with the smart home device 200 through a radio module in the devices and the smart home device 200. Such a radio module may be a RF device operating in the unlicensed spectrum, such as a 900 MHz RF radio, a 2.4 GHz or 5.0 GHz WiFi radio, a Bluetooth radio, or other radio modules.

Figure 3:
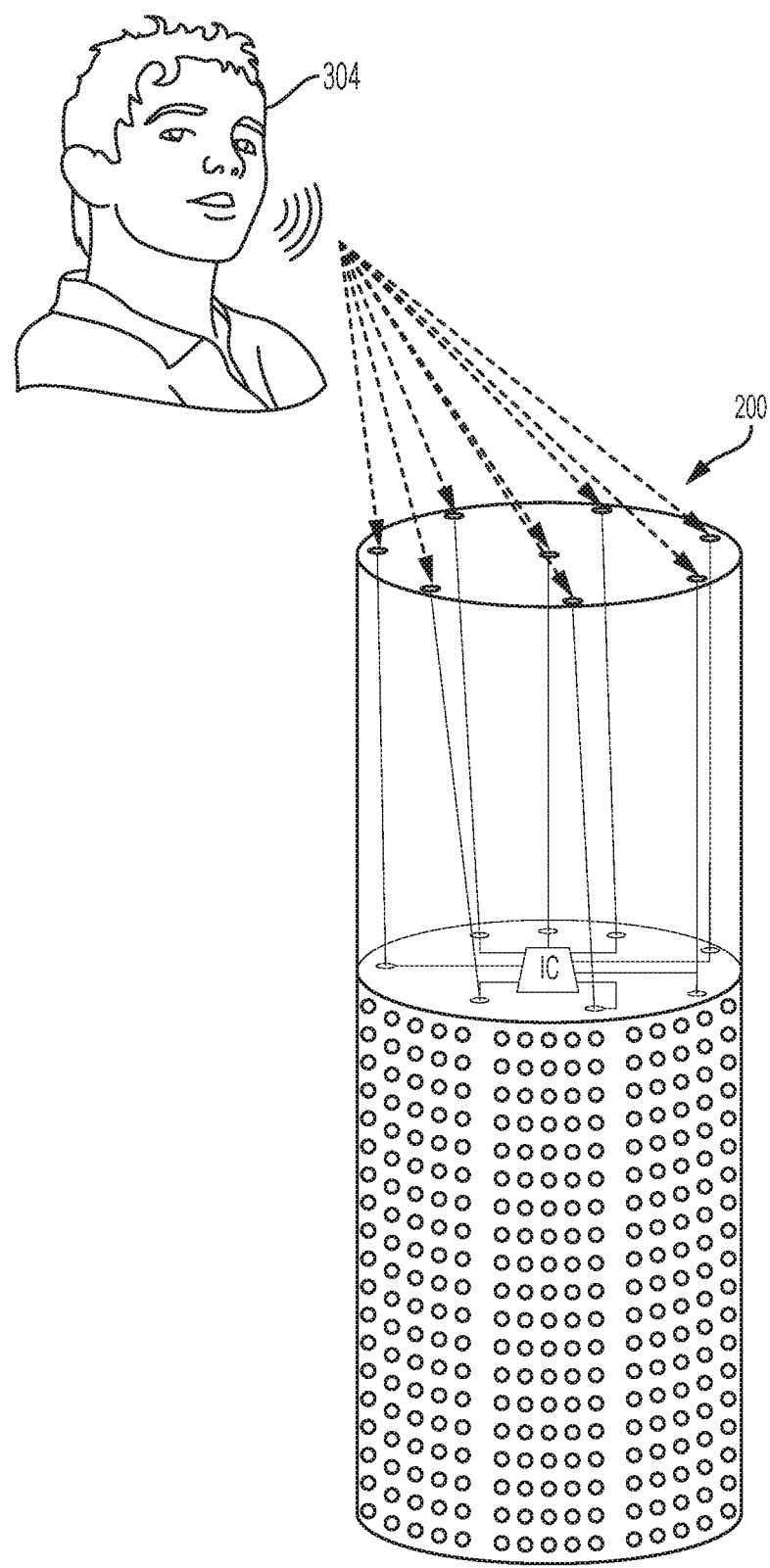
FIG. 3 is an illustration of different times of arrival of sound at two or more microphones according to some embodiments of the disclosure.
Figure 4A:
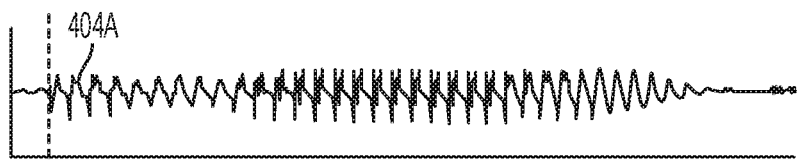
FIGS. 4A-I are graphs illustrating microphone signals from an array of microphones at different locations on an electronic device according to some embodiments of the disclosure.
Figure 4B:
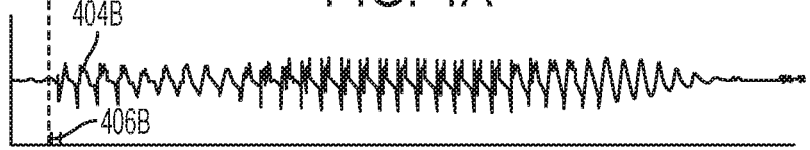
Figure 4C:
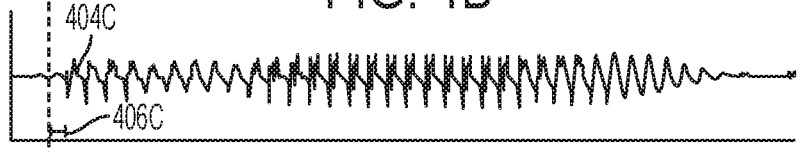
Figure 4D:
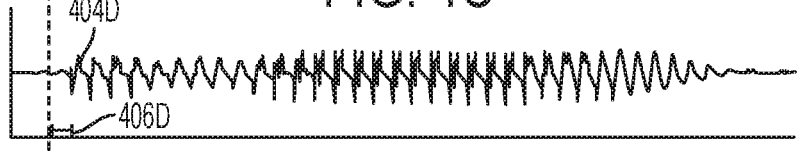
Figure 4E:
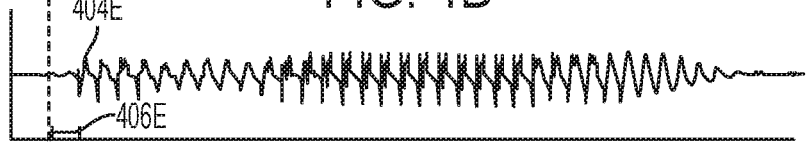
Figure 4F:
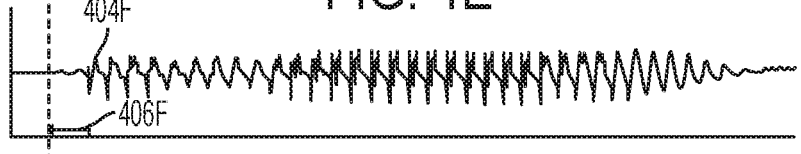
Figure 4G:
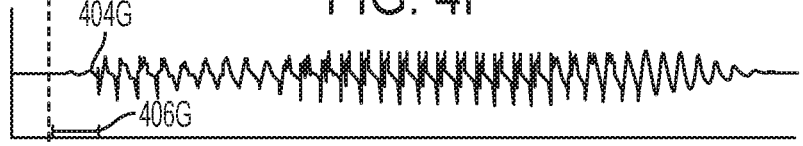
Figure 4H:
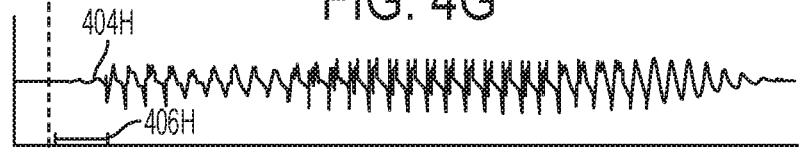
Figure 4I:
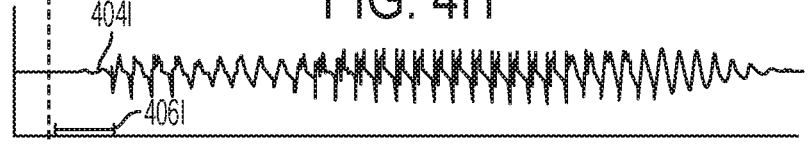

Microphones sense sound pressure changes in an environment over time. The different sound propagation times from a talker to the microphones on the smart device are illustrated in FIG. 3. A talker 304 may speak towards the microphones 202A-H. The distance from the talker's 304 mouth to each of the microphones 202A-H is different, resulting in each of the microphones 202A-H receiving sound with a different time delay. More generally, the acoustic paths from the talker's 304 mouth to the microphones 202A-H include both the direct propagation paths and reflections, and this governs the overall sound propagation times from the talker to each of the microphones.

FIGS. 4A-I are graph illustrating microphone signals from microphones at different positions on an electronic device, which may be used in some embodiments of the disclosure. A sound in an environment creates a pressure wave that spreads throughout the environment and decays as the wave travels. Each of the microphones 202A-H records the signal at a different time as the sound travels through the environment and reaches each of the microphones 202A-H. The closest microphone, which may be microphone 202A, records signal 404A. Other microphones receive the sound at a slightly later time as shown in signals 404B-I based the microphone's distance from the source, illustrated by the delays 406B-I. In general, the acoustic path of the sound arriving at each of the microphones includes both a direct propagation path and reflections, and the microphone recordings are a superposition of the direct propagation and reflections of the sound. As a result, the signals recorded by the different microphones may not be simply time-delayed with respect to each other.

Each of the signals 404A-H recorded by microphones 202A-H may be processed by IC 210. IC 210 may filter the microphone signals and calculate characteristics, such as inter-microphone phase information. For example, an inter-microphone frequency-dependent phase profile may be calculated for the signals 404A and 404B recorded by microphones 202A and 202B, respectively. The inter-microphone frequency-dependent phase profile is related to the timing difference between the signals 404A and 404B as governed by the sound propagation from an acoustic source to the microphones (including the direct path, room reverberation, and diffraction effects), and uniquely captures the acoustic path from the source to that microphone pair in the room. The inter-microphone frequency-dependent phase profile may be calculated for other pairs of microphones as well. The inter-microphone frequency-dependent phase profile may be used in far-field audio processing to improve voice quality and automatic speech recognition performance in noisy environments.

Figure 5:
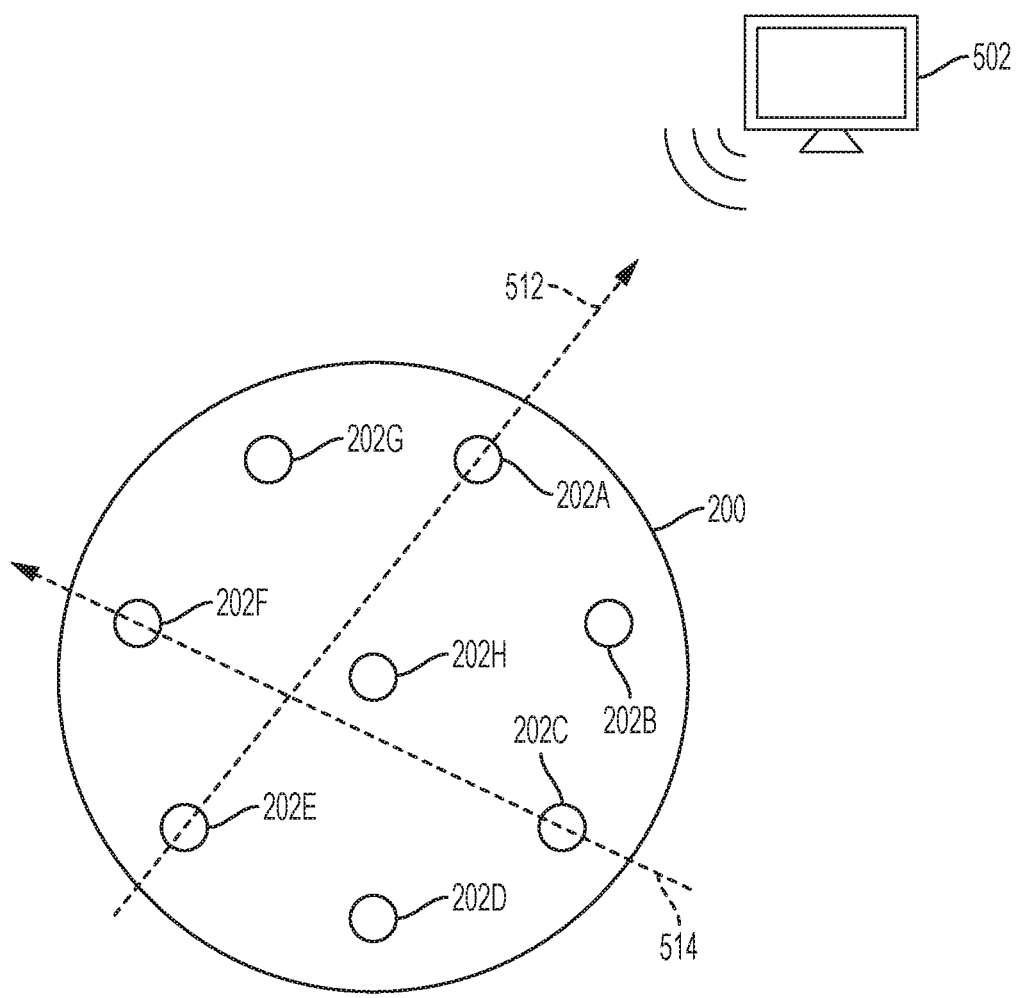
FIG. 5 is an illustration of phase delay for pairs of microphones in the array according to some embodiments of the disclosure.

The inter-microphone frequency-dependent phase profile may be used to identify the relative location of acoustic sources with respect to the microphone array. Assuming no reflections, or a near-field source, the pair of microphones aligned along a vector pointing in the direction of an acoustic source will have a larger inter-microphone phase than the pair of microphones aligned along a vector orthogonal to the direction of the acoustic source. FIG. 5 is an illustration of the inter-microphone phase for pairs of microphones in the array according to some embodiments of the disclosure. A television 502 may be in a direction along a vector 512 oriented from microphone 202A to microphone 202E. The inter-microphone phase calculated for the pair of microphones 202A and 202E for the television 502 may be the largest phase among any pair of microphones 202A-H. The inter-microphone phase calculated for the pair of microphones 202C and 202F along a vector 514 for the television 502 may be the smallest phase among any pair of the microphones 202A-H.

In smart home applications, interference sources can be differentiated from desired talkers based on the observation that many interference sources encountered in home environments may be characterized as persistent interference sources, i.e., those that recur from a fixed spatial location relative to the device, which is also fixed. Some examples of such interference sources include TVs, music systems, air-conditioners, washing machines, dishwashers, and microwave ovens. In contrast, real human talkers are not expected to remain stationary and speak continuously from the same position for a long time. From the device's perspective, the sound from a persistent interference source always arrives from the same unknown direction, but sound from a desired talker changes directions. Over time, the acoustic sources that arrive repeatedly from fixed directions may be identified as persistent interference sources.

Figure 6:
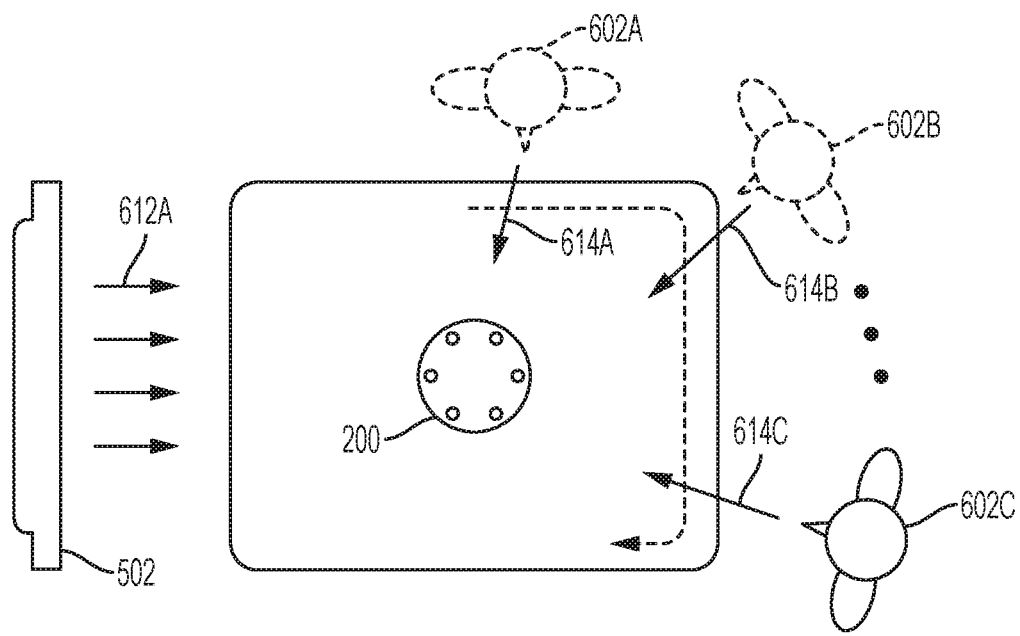
FIG. 6 is a perspective view of a free field environment with fixed and moving acoustic sources according to some embodiments of the disclosure.
Figure 7:
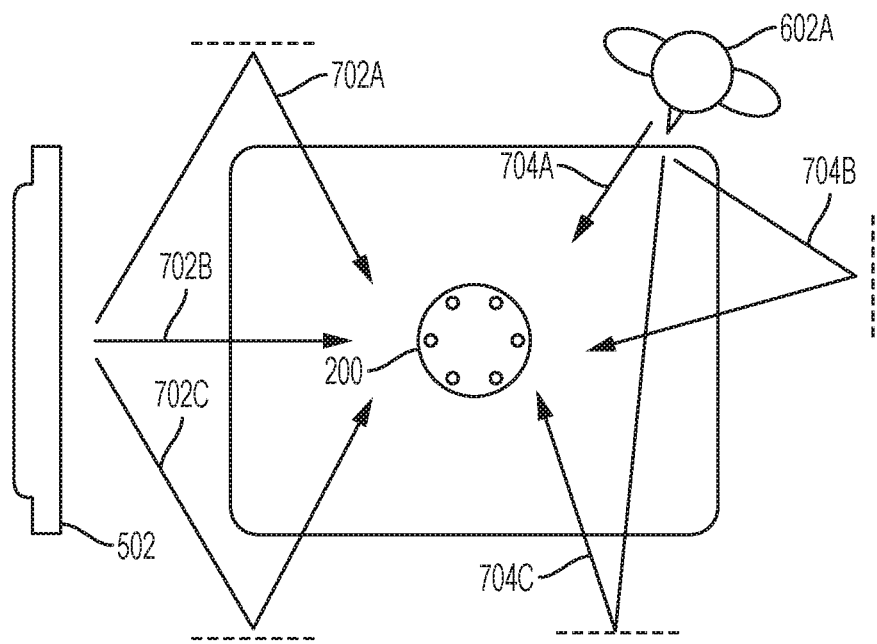
FIG. 7 is a perspective view of a reverberant room environment with fixed and moving acoustic sources according to some embodiments of the disclosure.

An example illustrating this differentiation is shown in FIG. 6. FIG. 6 is a perspective view of a free field environment with fixed and moving acoustic sources according to some embodiments of the disclosure. A smart home device 200 may be in the environment with an interference source 502 and a desired talker source 602. The interference source 502, such as a television, is a spatially stationary acoustic source with sound traveling along a constant direction 612A. The desired talker source 602, on the other hand, may move from location 602A to location 602B, and to location 602C. Each location 602A, 602B, and 602C has a different direction 614A, 614B, and 614C, respectively, to the smart home device 200. A historical record of audio from the microphone array of the device 200 will reveal recurrence of the interference source 502 from its constant direction. For example, the distribution of the inter-microphone phase over time will be show a maximum for the inter-microphone phase of the persistent interference source 502. Examples described with reference to FIG. 6 and FIG. 7 illustrate physical movement between different locations in a room as an example movement of a human talker source. However, movements by a talker source may be subtler, such as with the moving of a head, mouth, hands, arms, etc., all of which change the audio sounds recorded by the microphones at smart home device 200.

The same holds true for a reverberant environment, as shown in FIG. 7. FIG. 7 is a perspective view of a reverberant room environment with fixed and moving acoustic sources according to some embodiments of the disclosure. A device 200 may receive sound from the TV interference source 502 along an acoustic path that includes direct path 702A, and reflections 702B, and 702C and may receive sound from the desired talker source 602 along an acoustic path that includes direct path 704A, and reflections 704B, and 704C. As the talker source 602 moves, the paths 704A, 704B, and 704C change. However, since the TV interference source is spatially stationary, the paths 702A, 702B, and 702C do not change over time. Thus, the distribution of inter-microphone frequency-dependent phase profiles calculated using audio from the microphone array measurements over several time periods will show a maximum for the inter-microphone frequency-dependent phase profile of the persistent interference source 502. The inter-microphone frequency-dependent phase profile calculated using audio data from a microphone array may be utilized for acoustic source identification. The inter-microphone frequency-dependent phase profile uniquely captures the acoustic path from a desired talker or interference source to the microphone array in the environment. Persistent interference sources appear as acoustic sources with approximately constant inter-microphone frequency-dependent phase profiles, whereas human talkers appear as acoustic sources with changing inter-microphone frequency-dependent phase profiles. In one embodiment of the disclosure, persistent inter-ference inter-microphone frequency-dependent phase profiles may be learned based on identifying historically recurring inter-microphone frequency-dependent phase profiles in multiple time periods of the audio data. A persistent interference detection statistic may then be computed to differentiate between desired talker speech and persistent interference based on the similarity between the instantaneous inter-microphone frequency-dependent phase profile and the learned historically recurring inter-microphone frequency-dependent phase profiles. A high degree of similarity with a learned persistent interference inter-microphone frequency-dependent phase profile indicates that the acoustic source is a persistent interference source.

In some embodiments of the disclosure, the inter-microphone frequency-dependent phase profile may be computed across the entire frequency spectrum. In other embodiments, the inter-microphone frequency-dependent phase profile may be computed in a specific frequency range, such as in a frequency range above 1 kHz that can afford better spatial resolution capability depending on the microphone spacing. High frequency information can improve source identification performance based on better sensitivity to smaller movements of a desired talker.

In some embodiments, the comparison of the inter-microphone frequency-dependent phase profiles and persistent interference source detection can be performed over groups of smaller frequency bands. This processing can provide desired talker speech and interference detections with improved frequency resolution.

An advantage of this audio processing technique of differentiating between desired talker speech and interference is that it does not require knowledge of the talker and interference directions or environment, and is robust to talker distance, facing direction, and motion, and room reverberation. Also, because the audio processing uses spatial information to differentiate between interference and desired talker, it is not sensitive to variations in the spectral characteristics of the audio content itself. This insensitivity to variations provides detection performance that is robust to even high degrees of non-stationarity of the interference, which occurs when speech-like content is played on the TV. Furthermore, the interference detection approach is generally applicable to any spatially-stationary interference, including non-directional interference sources such as diffuse noise or babble/party noise.

Figure 8:
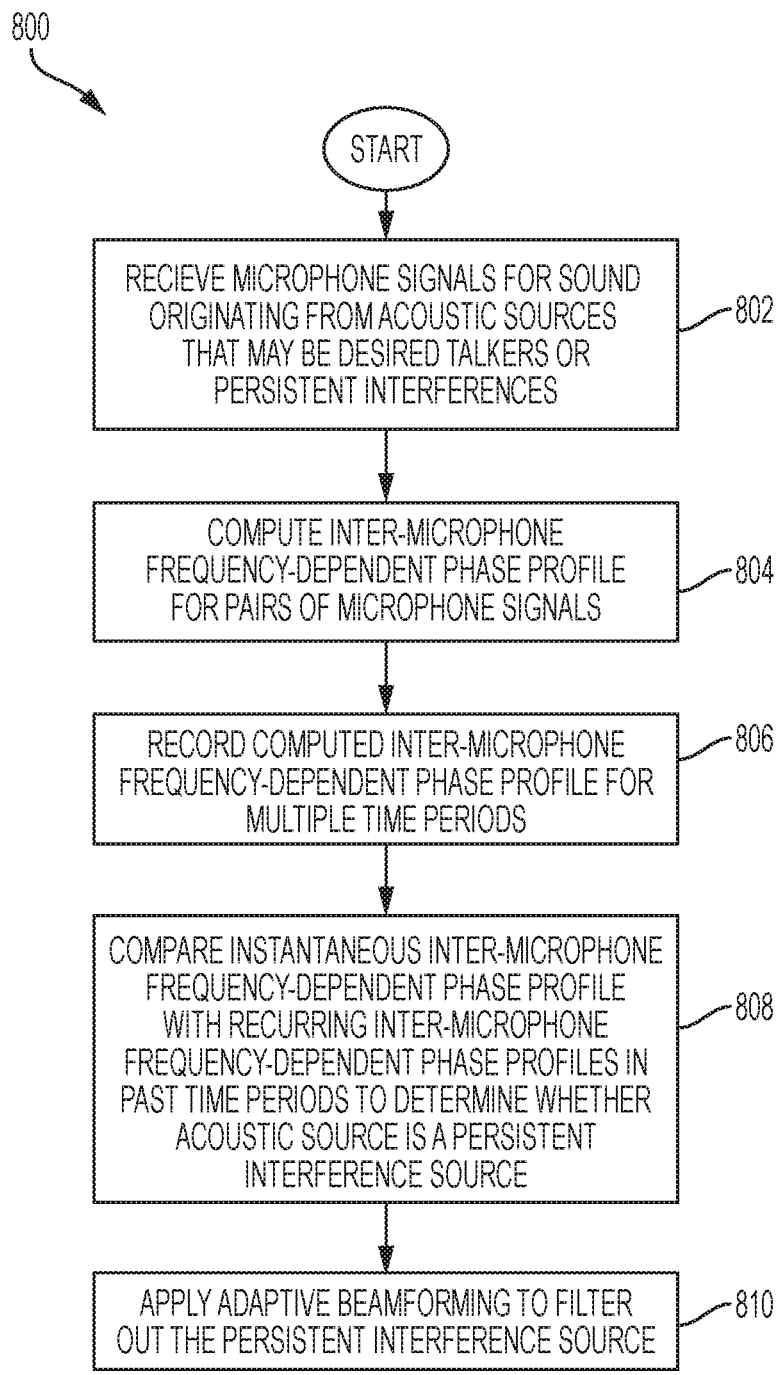
FIG. 8 is a flow chart of an example method for detecting and filtering out persistent interference sources according to some embodiments of the disclosure.

FIG. 8 is a flow chart of an example method for detecting and filtering out persistent interference sources according to some embodiments of the disclosure. A method 800 may begin at block 802 with receiving audio signals comprising microphone signals for sound originating from acoustic sources that may be desired talkers or persistent interference sources. At block 804, an inter-microphone frequency-dependent phase profile may be computed for pairs of microphone signals. At block 806, the computed inter-microphone frequency-dependent phase profile of block 804 may be recorded for multiple time periods. For example, multiple inter-microphone frequency-dependent phase profiles may be stored, or a single running histogram or distribution of the inter-microphone frequency-dependent phase profiles may be computed and stored. Then, at block 808, the instantaneous inter-microphone frequency-dependent phase profile is compared with recurring inter-microphone frequency-dependent phase profiles in the stored data from past time periods, to determine whether an acoustic source is a persistent interference source. The comparison at block 808 may involve the calculation of an interference detection statistic that corresponds to the likelihood of an acoustic source being a persistent interference source, based on its degree of similarity with the recurring inter-microphone frequency-dependent phase profiles in the stored data from past time periods. At block 810, an adaptive beamformer may be controlled using the decisions of the persistent interference detector to filter out any acoustic source that is determined to be a persistent interference source.

Figure 9:
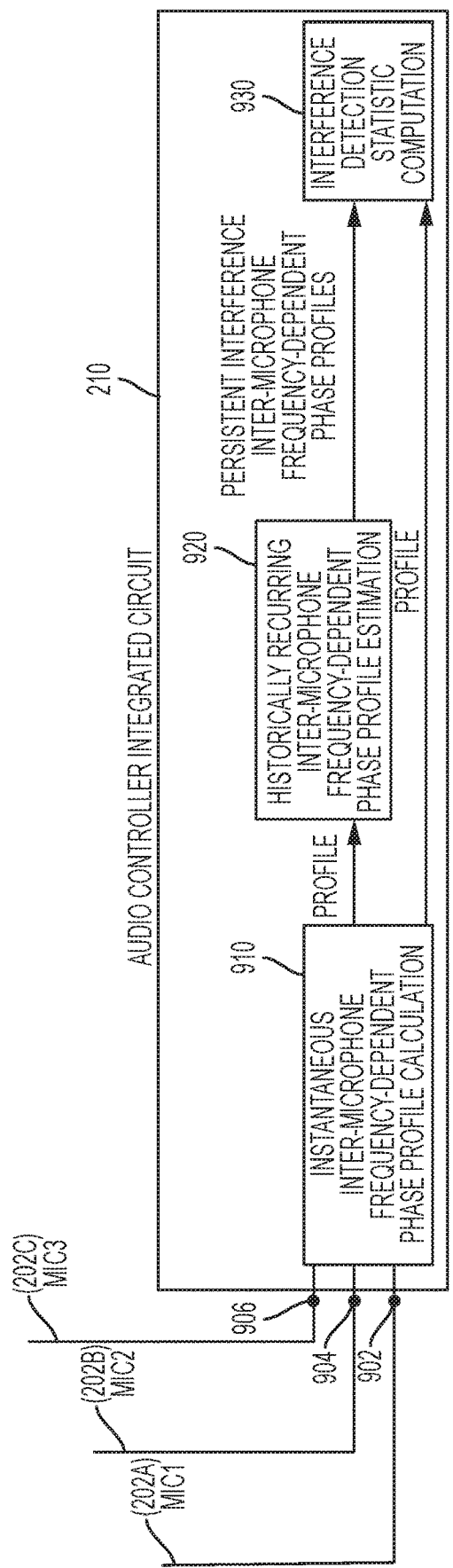
FIG. 9 is a block diagram illustrating an example integrated circuit for persistent interference detection according to some embodiments of the disclosure.

Methods of audio processing to detect persistent interference sources may be performed by an integrated circuit such as IC 210 of smart home device 200. FIG. 9 is a block diagram showing an example integrated circuit for interference detection according to some embodiments of the disclosure. The IC 210 of FIG. 9 may receive, at input nodes 902, 904, and 906, audio signals from microphones 202A, 202B, and 202C, respectively. A computation block 910 may calculate an instantaneous inter-microphone frequency-dependent phase profile based on input from microphones 202A-C. The inter-microphone frequency-dependent phase profile computed in block 910 is sent to the persistent interference inter-microphone frequency-dependent phase profile estimation block 920. Block 920 may update a historical record of recurring inter-microphone frequency-dependent phase profiles with the instantaneous inter-microphone frequency-dependent phase profile generated by the computation block 910. Block 920 may maintain a historical record of recurring inter-microphone frequency-dependent phase profiles for a period of time that is several times a sampling duration from input nodes 902, 904, and 906. For example, the historical record may be based on information over the previous 15 seconds of audio data. Block 920 may output the recurring persistent interference inter-microphone frequency-dependent phase profiles to block 930. Block 930 may also receive the instantaneous inter-microphone frequency-dependent phase profile from block 910 and compare the instantaneous and persistent interference inter-microphone frequency-dependent phase profiles to compute a persistent interference detection statistic. The computation blocks 910, 920, and 930 may be functions executed by one or more digital signal processors (DSPs).

Figure 10:
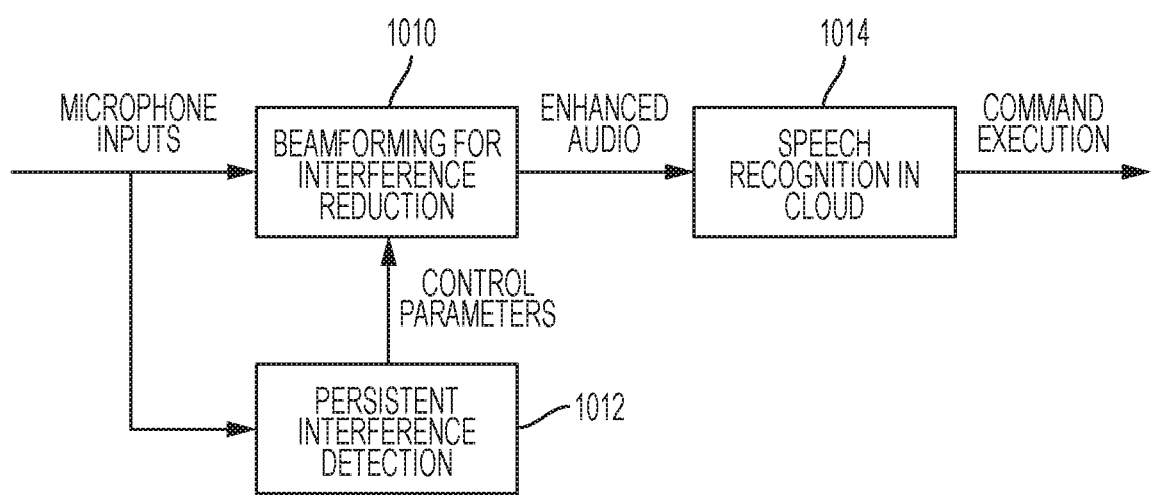
FIG. 10 is a block diagram illustrating an example incorporation of the persistent interference detection in a beamformer controller for audio enhancement according to some embodiments of the disclosure.

The functionality described for detecting persistent interference sources may be incorporated into a beamformer controller of an audio processing integrated circuit or other integrated circuit. The beamformer controller may use an interference determination, such as an interference detection statistic, to modify control parameters for a beamformer that processes audio signals from the microphone array. The beamformer processing generates an enhanced audio output signal by reducing the contribution of the interference sources, which improves voice quality and allows for more accurate and reliable automatic recognition of speech commands from the desired talker by a remote device in the cloud. FIG. 10 is a block diagram illustrating an example beamformer controller according to some embodiments of the disclosure. Microphones provide input signals to a beamformer 1010. The beamformer 1010 may operate using control parameters, such as a desired talker speech step size and an interference step size, derived from persistent interference detection results at block 1012. Enhanced audio produced by the beamformer 1010 may be sent to a remote system in cloud 1014 for automatic speech recognition or other processing. The remote system in cloud 1014 recognizes a command from the enhanced audio and may execute the command or send the command back to the smart home device for execution.

The functionality described for detecting persistent interference sources may be used in other audio processing tasks as well. For example, the persistent interference detection may be used for talker direction estimation, post-filtering, and/or automatic level control. Likewise, in addition to inter-microphone frequency-dependent phase profiles, other features such as inter-microphone frequency-dependent magnitude profile may also be used for persistent interference detection.

The operations described above as performed by a persistent interference detector and beamforming controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the integrated circuit (IC) that contains the audio processing may include other functionality. For example, the IC may include an audio coder/decoder (CODEC) along with circuitry for performing the functions described herein. Such an IC is one example of an audio processor. Other audio functionality may be additionally or alternatively integrated with the IC circuitry described herein to form an audio processor.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The described methods are generally set forth in a logical flow of steps. As such, the described order and labeled steps of representative figures are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although digital signal processors (DSPs) are described throughout the detailed description, aspects of the invention may be implemented on other processors, such as graphics processing units (GPUs) and central processing units (CPUs). Where general purpose processors are described as implementing certain processing steps, the general purpose processor may be a digital signal processors (DSPs), a graphics processing units (GPUs), a central processing units (CPUs), or other configurable logic circuitry. As another example, although processing of audio data is described, other data may be processed through the filters and other circuitry described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving a first microphone signal and a second microphone signal, wherein the first microphone signal and the second microphone signal comprise audio data from acoustic sources recorded using a microphone array at a fixed location in an environment, and wherein the acoustic sources comprise desired talkers and interference sources; and
identifying an acoustic source as a persistent interference source, wherein the identifying comprises:
 identifying, in multiple time periods of the audio data, a recurring inter-microphone frequency-dependent phase profile for the first microphone signal and the second microphone signal; and
 determining, based on the identified recurring inter-microphone frequency-dependent phase profile, that the acoustic source is originating from the same spatial location with respect to the microphone array in the multiple time periods of the audio data,
wherein identifying the acoustic source as a persistent interference source further comprises:
 determining instantaneous inter-microphone frequency-dependent phase profiles at a plurality of times using the first microphone signal and the second microphone signal, wherein identifying, in multiple time periods of the audio data, a recurring inter-microphone frequency-dependent phase profile for the first microphone signal and the second microphone signal is based on comparing the instantaneous inter-microphone frequency-dependent phase profiles at a plurality of times;
 storing one or more recurring inter-microphone frequency-dependent phase profiles;
 determining if an instantaneous inter-microphone frequency-dependent phase profile corresponds to a persistent interference source by comparing the instantaneous inter-microphone frequency-dependent phase profile with one or more recurring inter-microphone frequency-dependent phase profiles; and
 receiving additional microphone signals from the microphone array,
 wherein the step of determining instantaneous inter-microphone frequency-dependent phase profiles, the step of identifying recurring inter-microphone frequency-dependent phase profiles, and the step of determining if an instantaneous inter-microphone frequency-dependent phase profile corresponds to a persistent interference source are each based on using multiple pairs of microphone signals.

2. The method of claim 1, wherein the step of identifying an acoustic source as a persistent interference source comprises comparing inter-microphone frequency-dependent phase profiles for a plurality of frequency sub-bands.

3. The method of claim 1, wherein the step of identifying an acoustic source as a persistent interference source is based on recurrence of an inter-microphone frequency-dependent magnitude profile.

4. The method of claim 1, wherein the step of identifying an acoustic source as a persistent interference source comprises identifying persistent interference sources in a home environment.

5. The method of claim 1, further comprising beamforming a plurality of microphone signals to generate an enhanced audio output signal with reduced contribution from the identified persistent interference source.

6. The method of claim 5, wherein the step of generating an enhanced audio output signal comprises generating control parameters for the beamforming of the plurality of microphone signals to reduce the contribution of the identified persistent interference sources.

7. The method of claim 5, further comprising processing the enhanced audio output signal to recognize speech from the desired talker.

8. The method of claim 1, further comprising talker direction estimation, post-filtering, and/or automatic level control based on the identification of an acoustic source as a persistent interference source.

9. An apparatus, comprising:
an integrated circuit configured to perform steps comprising:
 receiving a first microphone signal and a second microphone signal, wherein the first microphone and the second microphone signal comprise audio data from acoustic sources recorded using a microphone array at a fixed location in an environment; and identifying an acoustic source as a persistent interference source, wherein the identifying comprises:
identifying, in multiple time periods of the audio data, a recurring inter-microphone frequency-dependent phase profile for the first microphone signal and the second microphone signal; and
determining, based on the identified recurring inter-microphone frequency-dependent phase profile, that the acoustic source is originating from the same spatial location with respect to the microphone array in the multiple time periods of the audio data,
wherein identifying an acoustic source as a persistent interference source further comprises:
determining instantaneous inter-microphone frequency-dependent phase profiles at a plurality of times using the first microphone signal and the second microphone signal, wherein identifying, in multiple time periods of the audio data, a recurring inter-microphone frequency-dependent phase profile for the first microphone signal and the second microphone signal is based on comparing the instantaneous inter-microphone frequency-dependent phase profiles at a plurality of times;
storing one or more recurring inter-microphone frequency-dependent phase profiles;
determining if an instantaneous inter-microphone frequency-dependent phase profile corresponds to a persistent interference source by comparing the instantaneous inter-microphone frequency-dependent phase profile with one or more recurring inter-microphone frequency-dependent phase profiles; and
receiving additional microphone signals from the microphone array,
wherein the step of determining instantaneous inter-microphone frequency-dependent phase profiles, the step of identifying recurring inter-microphone frequency-dependent phase profiles, and the step of determining if an instantaneous inter-microphone frequency-dependent phase profile corresponds to a persistent interference source are each based on using multiple pairs of microphone signals.

10. The apparatus of claim 9, wherein the integrated circuit is configured to identify an acoustic source as a persistent interference source by comparing inter-microphone frequency-dependent phase profiles for a plurality of frequency sub-bands.

11. The apparatus of claim 9, wherein the integrated circuit is configured to identify an acoustic source as a persistent interference source based on recurrence of an inter-microphone frequency-dependent magnitude profile.

12. The apparatus of claim 9, wherein the integrated circuit is configured to identify an acoustic source as a persistent interference source by identifying persistent interference sources in a home environment.

13. The apparatus of claim 9, wherein the integrated circuit is further configured to beamform a plurality of microphone signals to generate an enhanced audio output signal with reduced contribution from the identified persistent interference source.

14. The apparatus of claim 13, wherein the integrated circuit is configured to generate an enhanced audio output signal by generating control parameters for the beamforming of the plurality of microphone signals to reduce the contribution of the identified persistent interference sources.

15. The apparatus of claim 13, wherein the integrated circuit is further configured to process the enhanced audio output signal to recognize speech from a desired talker.

16. The apparatus of claim 9, wherein the integrated circuit is further configured to perform talker direction estimation, post-filtering, and/or automatic level control based on the identification of an acoustic source as a persistent interference source.

* * * * *

UNITED STATES PATENT AND TRADEMARK OFFICE
CERTIFICATE OF CORRECTION

| | |
|---|---|
| PATENT NO. | : 11,189,303 B2 |
| APPLICATION NO. | : 15/714190 |
| DATED | : November 30, 2021 |
| INVENTOR(S) | : Kovvali et al. |

It is certified that error appears in the above-identified patent and that said Letters Patent is hereby corrected as shown below:

On the Title Page

In Item (57), under "ABSTRACT", in Column 2, Line 5, delete "repeated" and insert -- repeatedly --, therefor.

Signed and Sealed this
Twenty-first Day of February, 2023

Katherine Kelly Vidal
*Director of the United States Patent and Trademark Office*